July 17, 1923.

J. J. SEEMANN 1,461,943

HEATER CASING CONSTRUCTION

Filed July 24, 1922

Inventor

Jacob J. Seemann

By Martin & Rendell

Attorneys

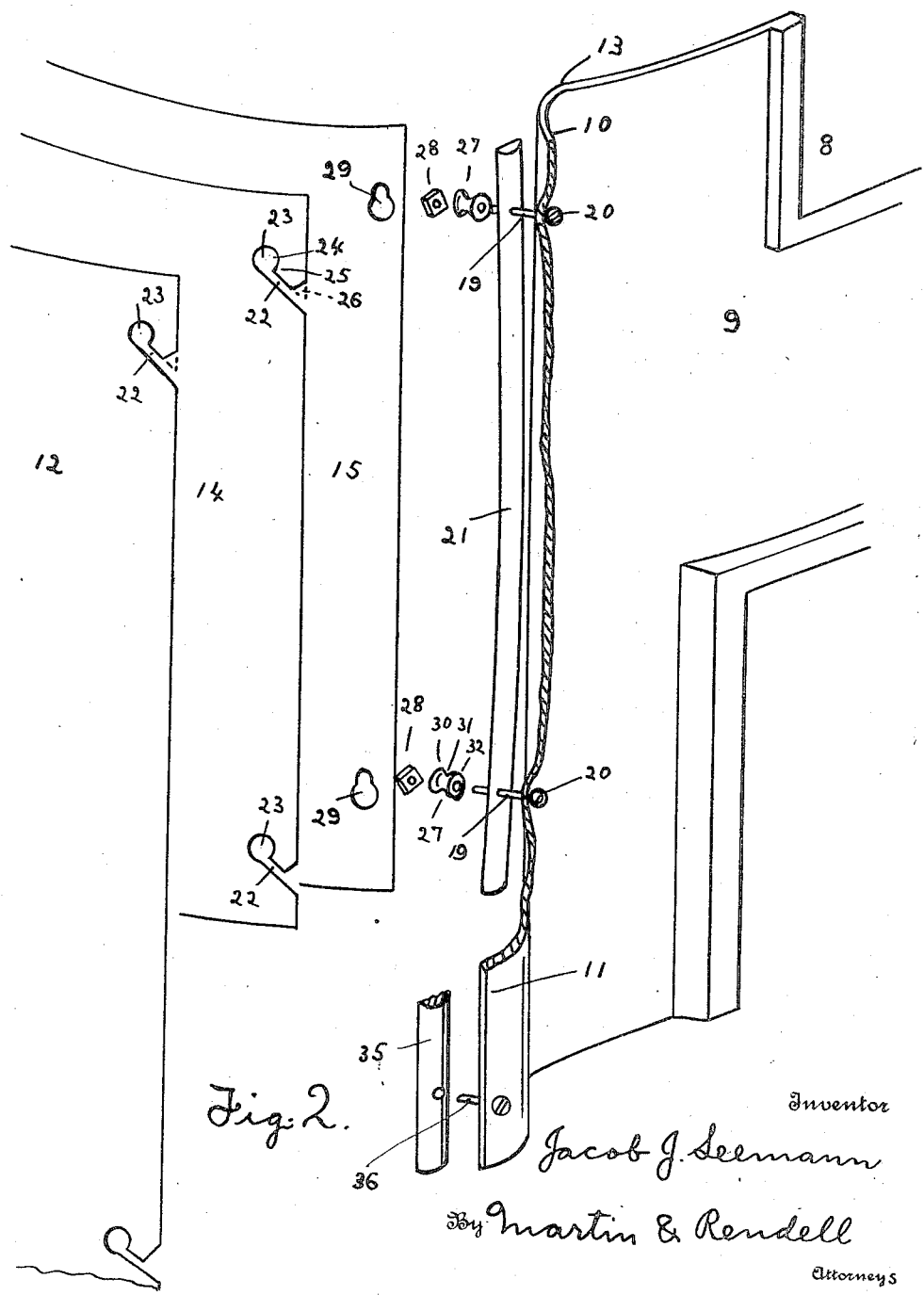

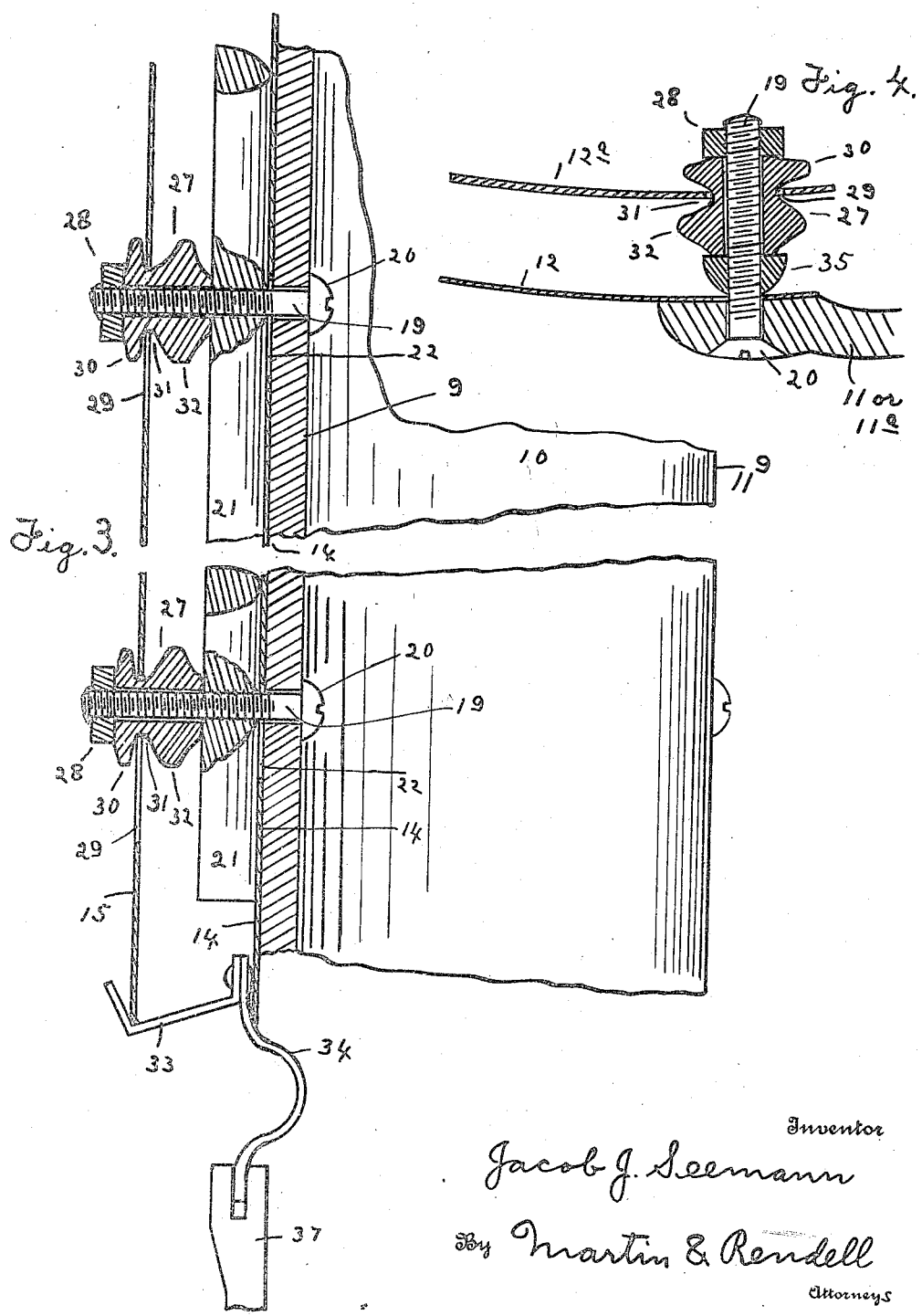

Patented July 17, 1923.

1,461,943

UNITED STATES PATENT OFFICE.

JACOB J. SEEMANN, OF UTICA, NEW YORK, ASSIGNOR TO UTICA HEATER COMPANY, OF UTICA, NEW YORK, A CORPORATION.

HEATER-CASING CONSTRUCTION.

Application filed July 24, 1922. Serial No. 576,988.

*To all whom it may concern:*

Be it known that I, JACOB J. SEEMANN, a citizen of the United States, and a resident of Utica, in the county of Oneida and State of New York, have invented certain new and useful Improvements in Heater-Casing Constructions; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a heater casing construction particularly adapted for use in warm air heaters where two casings are to be secured to a panel front or other rigid part with said casings spaced a short distance from each other.

The purpose of my invention is to provide a device of the class described which is simple and economical in construction, particularly convenient to assemble and efficient and durable in operation.

In many warm air heaters where it is deseried to mount two casings relatively close to each other there has been heretofore great practical difficulty in readily but securely fastening the forward edges of these casings to the panel front, in view of the fact that the inner casing has to be placed about the heater and attached to the panel front first while the second of this pair of casings has then to be placed in position but will then have its edges come nearer to and ordinarily immediately against the rear face of the panel and so in front of the edges of the inner casing already set up. To overcome these practical difficulties and still mount the said two casing upon the panel front or other fixed part by one series of fastening devices is a further purpose of my invention.

Another object of my invention is to provide a heater casing construction wherein the means for attaching two casings to a panel front are provided upon said front panel and said means and the co-operating edges of the casings are of such form that the inner casing may be readily mounted and then the outer casing of this pair of casings may be interposed between the inner casing and the panel and adjusted to proper position readily and conveniently and without either casing or its mounting or adjustment being disturbed.

A further purpose is to provide a construction of the character mentioned that is adapted for use wherever two casings are to be secured to a panel front or other rigid part with one casing held immediately against said panel front and the other casing spaced a short distance therefrom and to have the parts of said construction so formed that means are provided for loosely holding both casings in place during the first erection of the parts and with sufficient adjustment to get each casing in proper position and then to hold said casings permanently in desired position.

Another object is to provide simple means for holding one casing loosely or adjustably at spaced distance from another casing or fixed part of the heater; and further to provide a construction wherein the parts may be standard and the necessary apertures in the casings made at the factory or shop so that the workman or customer erecting the heater does not have to cut or make any perforations in the casings.

Further purposes and advantages of my invention will appear from the specification and claims herein.

Fig. 2 is a perspective view of one edge of the panel front and the co-operating edges of the three casings and the means used for fastening said parts together, said parts being shown in the relative position they occupy immediately before being assembled, a part of the flanged edge of the panel front being broken away in order to more clearly show my invention.

Fig. 3 is a vertical sectional view of the lower part of the casing construction on line 3—3 of Fig. 1 on an enlarged scale.

Fig. 4 is a detailed horizontal sectional view showing a construction embodying my invention which may be adapted for use in various places.

Figure 1:
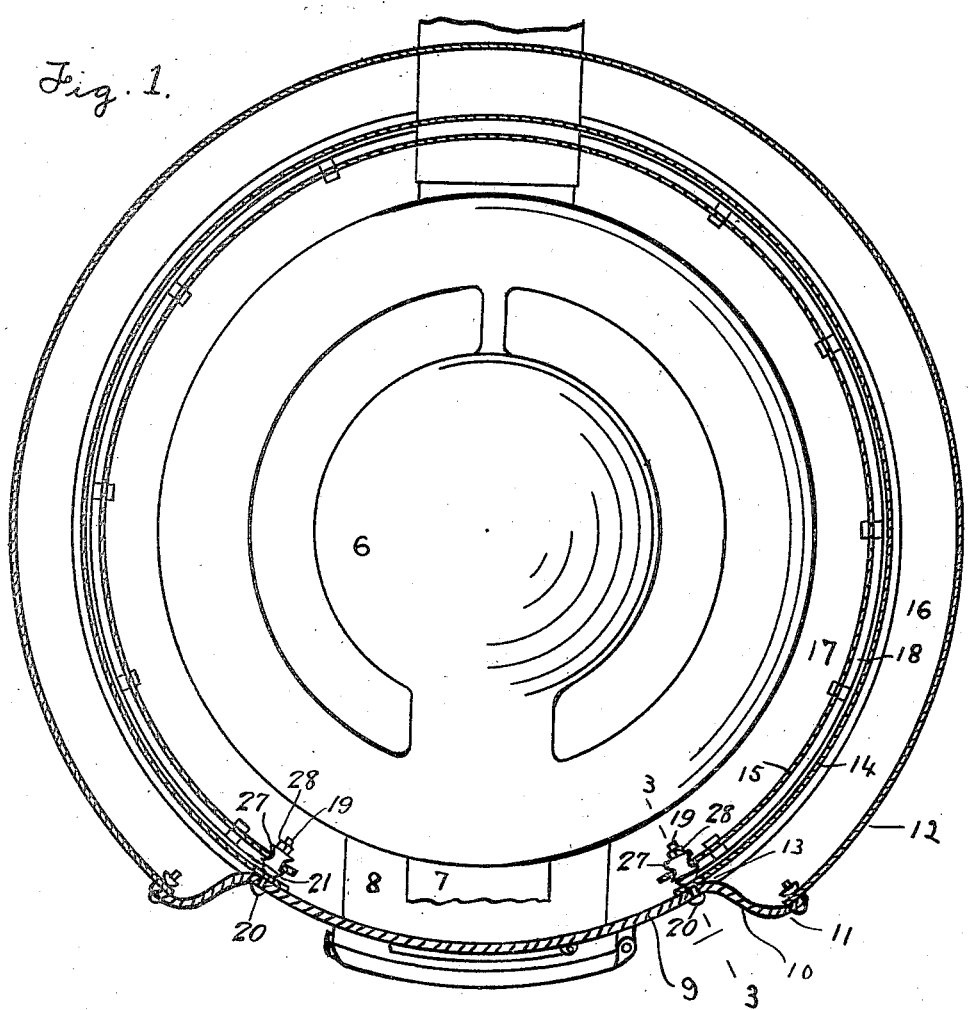
Fig. 1 is a horizontal sectional view through a heater having a heater casing construction embodying my invention.

It will be seen from Figs. 1 to 3 of the drawings that I have applied my invention to the middle and inner casings of a heater equipped with three casings of sheet metal. My invention is especially adapted and peculiarly convenient for that situation, but it will be understood that the invention is not limited to that situation but may be used in other combinations such as shown in Fig. 4 where my invention is used to hold the outer and inner casing of a two-casing heater in closely spaced relation really as a means of insulating the outer casing of an ordinary multiple pipe heater.

Referring to the drawings in a more particular description and first to the construction shown in Figs. 1 to 3, it will be seen that the heater proper 6 has its operating passages such as the clean-out passage 7, the fuel passage 8 and the ash pit passage project forwardly to the panel front 9. This panel front is provided on each vertical edge with a forwardly projecting flange 10 which at its forward edge is again turned laterally forming an edge flange 11 to the immediate rear of which is attached the opposite edges of the outer casing 12. To the opposite vertical edges 13 of the main portion of the panel front just before the forwardly projecting flanges 10 begin there is secured the opposite vertical edges of the middle casing 14. Upon these vertical edges 13 of the panel front there is also to be mounted the opposite vertical edges of the inner casing 15. It will be understood that the heater illustrated in Figs. 1 to 3 is of the three-casing type and usually pipeless heater wherein the cold air is brought to the heater and passes downwardly through the chamber 16 being the space between the outer casing 12 and middle casing 14 to a line about on a level with the middle of the ash pit whence the air passes inwardly and upwardly mostly through the chamber 17 between the inner casing 15 and the heater proper 6 while a smaller quantity of the air passes upwardly through the middle and relatively narrow chamber 18 formed between the middle casing 14 and the inner casing 15. The purpose of the middle chamber 18 is to form an effective insulation by means of continually changing air between the cool descending air in the outer chamber 16 and the air ascending and being warmed in the inner chamber 17. This air insulation and middle chamber is formed by adding the inner casing 15. The mechanical difficulty heretofore has been to provide simple, economical and conveniently assembleable means for holding the opposite vertical edges of the inner casing 15 spaced slightly inwardly from the circle of the panel front and inwardly from the middle casing 14 and particularly to provide means that would be not only the means for holding the said inner edges of the inner casing in the desired position permanently but also be the means for temporarily erecting and holding the edges and largely thereby the whole body of the inner casing while the middle casing is being assembled so close to the inner casing and with the vertical edges of the middle casing between the edges of the inner casing and the side edges 13 of the panel front.

At proper intervals in a vertical line along the vertical side edge 13 of the panel front 9 there are provided bolt-receiving apertures. Through each of these apertures projects loosely inwardly the shank of a bolt 19 whose slotted head 20 bears against the outside of the panel front. On a pair of these bolts at either side of the panel front is mounted a bar preferably a half round bar 21 as by said bolts being screwthreaded through said half round bar. Preferably the rod 21 curves to the front slightly intermediate its ends so that as one edge of the middle casing 14 is inserted between said rod and the rear surface of the panel front along its vertical side edge 13 and then the bolts 19 are screwed up the said rod will first engage and pinch the middle casing 14 closely to the panel front intermediate the ends of said bar 21 and as the bolts 19 are further tightened the bar will be straightened and hold the edge of the middle casing smoothly throughout its entire height.

Preferably in this construction also I use not only the half round bar and bolts as already mentioned, but also another feature covered by my prior Patent No. 1,379,051 namely, a peculiar slotted arrangement of the edge of the middle casing in order to readily mount the edges of the said inner casing upon the bolts 19 and so hold the edges of said casing temporarily in place while the whole of that casing is being adjusted and fastened permanently. The slotted arrangement referred to is plainly shown upon the outer casing 12 and the inner casing 14 in Fig. 2 of the drawing herein.

Into the opposite vertical edges of these casings extend slots 22 corresponding in number with the bolts 19 and spaced apart a similar distance. These slots 22 extend inwardly from the extreme vertical edge of the casing in an upwardly slanting direction and open into an enlargement 23 extending lengthwise of the casing as by a circular hole at the end of the slot. The enlargement 23 extends back towards the adjacent edge of the casing beyond the inner end of the slanting slot 22 forming a pocket 24 and leaving a downwardly directed and inwardly extending hook 25 formed of the material of the casing. Preferably the outer end of the slanting slot 22 will be widened by cutting away a part of the point of metal 26 left between the upper side of the slot 22 and the near vertical edge of the casing.

To the rear of the bar 21 upon the shank of each bolt 19 is mounted preferably loosely a spool 27 conveniently formed of cast metal. A convenient form of this spool is shown in the drawings particularly in Fig. 3. Upon the screw-threaded portion of the bolt 19 beyond the spool 27 is placed a nut 28.

Preferably the rods 21 will be loosely assembled upon the panel front 9 at the factory or shop and the spools 27 placed to the rear of the bar 21 and the nuts 28 placed in position upon the inner ends of the bolts and then the inner ends of the bolts will be burred over sufficiently to prevent the accidental removal of the nuts from the bolts.

The ends of the different sections of the inner casing 15 will have provided therein near its vertical edges pairs of apertures 29 of elongated form in a vertical direction and also somewhat larger toward their bottom end but preferably in the form of a key-hole slot as plainly seen in Fig. 2. The pairs of apertures are spaced apart the same distance as the bolts and spools to co-operate therewith and the relative size, shape and proportion of the parts is such that the inner casing 15 may be mounted upon the spools 27 by having the large and lower parts of the apertures 29 go over the inner hub 30 of the spools 27 and then by lowering the casing 15 slightly the smaller and upper end of the aperture 29 rests in the valley 31 of the spool between its inner hub 31 and its outer hub 32. After one end of the inner casing 15 is thus securely mounted upon its pair of spools 27 this section of the inner casing is placed in position about the heater proper and the other and similar apertured edge of the inner casing is brought near a similar set of spools and bolts upon the other vertical edge of the panel front and securely mounted there in a similar obvious manner. As the inner casing 15 is thus being mounted upon the spools and being allowed to drop or being forced all the way down upon the spools the lower edge of the section will be brought into proper engagement with the casing ring ordinarily used with such sheet metal casings or in the case of the lower section of the inner casing in my construction secured upon inwardly extending hooks 33 provided upon the casing ring 34 just below the lower section of the middle casing 14 as plainly seen in Fig. 3.

With the two vertical edges of the inner casing thus securely but somewhat loosely held in position and with the whole bar 21 still spaced away from or to the rear of the panel front 9, one vertical edge of the middle casing 14 is interposed between the rod 21 and the panel front by causing the large outer ends of the slanting slots 22 to straddle the shanks of the bolts and then by passing this edge of the middle casing further toward the panel front and slightly downwardly until the bolts rest in the enlargements 23. The hook portions 25 then prevent this end of this casing from being displayed while the workman bends the rest of this section of the casing about the heater and by obvious manipulation mounts the other edge of the casing which is similarly slotted upon the corresponding set of bolts upon the other edge of the front panel. With the two ends of this section of inner casing thus loosely but securely held in position it may be adjusted to the proper fit and also adjusted to the casing ring therebelow such as the ring 34 in the case of the lower section of this casing. Then by tightening up the bolts 19 the holding bar 21 is brought forward and clamps the two edges of the middle casing 14 rigidly against the panel front and also draws forward somewhat or towards each other the spools 27 carrying the two edges of the inner casing 15 by reason of the setting up of the bolts causing the bolts to be radial instead of drawn laterally thereby tightening up the inner casing.

Ordinarily the heater casing will have at least two sections of the inner and the middle casing, but as these will be constructed and assembled in a similar way a detailed description thereof is unnecessary except to say that between adjacent sections of the inner casing there will be preferably placed an ordinary casing ring corrugated in vertical cross section and a similar ring will be placed between the upper and lower sections of the middle casing.

I have shown and described herein as the means for holding the middle casing the construction covered by my previous Patent No. 1,379,051 as that construction is a convenient one to use in combination with my present invention and will be the preferred construction of my full invention. It will be understood, however, that any other suitable means for holding the edges of the middle casing to the adjacent rear surface of the panel front may be used since the particular form of slanting slots 22 and enlargements 23 or holding bar 21 are not necessary to obtain the full advantage of the spools 27 employed by me in this invention to space the inner casing from the middle casing and hold it by the same set of bolts or other fastening means as hold the middle casing to the panel front.

The outer casing 12 as shown in Fig. 2 may be and preferably will be provided with the same arrangement of slanting slots 22 with enlargements 23 as already described and will co-operate with a holding rod 33 similar to the holding rod 21 already described and the edges of the outer casing will be fastened to the extreme flange portion 11 of the panel front as described in my aforementioned patent and as already described herein with regard to the middle casing.

It is a notable convenience in this construction that the two closely located inner casings can be erected and permanently secured in place without the inconvenience and loss of time of having to fit loose nuts to the ends of bolts within the casings.

Fig. 4 shows an embodiment of my invention illustrative of a further use of my invention namely that it can be used in a so-called single casing heater to secure a secondary and heat insulating jacket closely inside the main or outer casing of the furnace or secondly showing how the outer casing of a heater such as shown in Figs. 1 and 2 of the drawings herein can have a secondary or extra heat insulating jacket secured at a short distance inside of the outer casing but spaced evenly therefrom in the same way as the inner casing is spaced from the middle casing heretofore described in detail.

What I claim as new and desire to secure by Letters Patent is:

1. In a heater casing construction, the combination of a panel front having its side edges provided at intervals with bolt-receiving apertures, outer casing-holding means at the rear of each side edge of said panel front with bolt holes opposite the bolt holes in the panel, bolts extending loosely through said panel apertures and extending through said outer casing-holding member and projecting inwardly thereof, a spool mounted on said inward portion of each bolt, a nut on the inner end of each bolt, an outer casing held between the rear of the panel front and said outer casing-holding member and an inner casing having apertures near its vertical edges and registering with said spools whereby said inner casing is hooked onto said spools.

2. In a heater casing construction, the combination of a panel front having its side edges provided at intervals with bolt-receiving apertures, a rod at the rear of each side edge of said panel front with bolt holes opposite the bolt holes in the panel, bolts extending loosely through said panel apertures and extending through said rods and projecting inwardly thereof, a spool mounted on said inward portion of each bolt, a nut on the inner end of each bolt, a casing held between the rear of the panel front and said vertical rod and an inner casing having apertures near its vertical edges and registering with said spools whereby said inner casing is hooked onto said spools.

3. In a heater casing construction, the combination of a panel front having its side edges provided at intervals with bolt-receiving apertures, bolts extending loosely through said apertures, means screw-threaded onto said bolts, a first casing adapted to be inserted between said means and the rear of the panel front, spools mounted on said bolts beyond the first casing and a second casing provided with apertures near its vertical edges fitting the spools whereby the second casing is held up by the panel front but spaced from said first casing.

4. In a heater casing construction, the combination of a panel front having its side edges provided at intervals with bolt-receiving apertures, outer casing-holding means at the rear of each side edge of said panel front with bolt holes opposite the bolt holes in the panel, bolts extending loosely through said panel apertures and screw-threaded through said outer casing-holding member and projecting inwardly thereof, a spool non-removably mounted on said inward portion of each bolt, an outer casing held between the rear of the panel front and said outer casing-holding member and an inner casing having apertures near its vertical edges and registering with said spools whereby said inner casing is hooked onto said spools.

5. In a heater casing construction, the combination of a panel front having its side edges provided at intervals with bolt-receiving apertures, a rod at the rear of each side edge of said panel front with bolt holes opposite the bolt holes in the panel, bolts extending loosely through said panel apertures and screw-threaded through said rods and projecting inwardly thereof, a spool non-removably mounted on said inward portion of each bolt, a casing held between the rear of the panel front and said vertical rod and an inner casing having apertures near its vertical edges and registering with said spools whereby said inner casing is hooked onto said spools.

6. In a heater casing construction, the combination of a panel front having its side edges provided at intervals with bolt-receiving apertures, bolts extending loosely through said apertures, means screw-threaded onto said bolts, a first casing adapted to be inserted between said means and the rear of the panel front and attachable thereto and detachable therefrom without removing said means from said bolt, spools mounted on said bolts beyond the first casing and a second casing provided with apertures near its vertical edges fitting the spools whereby the second casing is held up by the panel front but spaced from said first casing.

7. In a heater casing construction, the combination of a panel front having its side edges provided at intervals with bolt-receiving apertures, bolts extending loosely through said apertures, means screw-threaded onto said bolts, a first casing adapted to be inserted between said means and the rear of the panel front, spools mounted on said bolts beyond the first casing and a second casing provided with keyhole slots near its vertical edges attachably and detachably fitting the spools whereby the second casing is held up by the panel front but spaced from said first casing.

8. In a heater casing construction, the combination of a panel front having its side edges provided at intervals with bolt-receiving apertures, bolts extending loosely through said apertures, means screw-threaded onto said bolts, a first casing adapted to be inserted between said means and the rear of the panel front and attachable thereto and detachable therefrom without removing said means from said bolts, spools mounted on said bolts beyond the first casing and a second casing provided with keyhole slots near its vertical edges attachably and detachably fitting the spools whereby the second casing is held up by the panel front but spaced from said first casing.

In witness whereof I have affixed my signature, this 1st day of July 1922.

JACOB J. SEEMANN.